United States Patent
Liu et al.

(10) Patent No.: US 11,714,417 B2
(45) Date of Patent: *Aug. 1, 2023

(54) INITIAL TRAJECTORY GENERATOR FOR MOTION PLANNING SYSTEM OF AUTONOMOUS VEHICLES

(71) Applicant: UATC, LLC, Mountain View, CA (US)

(72) Inventors: Chenggang Liu, Pittsburgh, PA (US); Moslem Kazemi, Allison Park, PA (US); David McAllister Bradley, Pittsburgh, PA (US); Tianyu Gu, Pittsburgh, PA (US); Michael Lee Phillips, Pittsburgh, PA (US)

(73) Assignee: UATC, LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/498,378

(22) Filed: Oct. 11, 2021

(65) Prior Publication Data

US 2022/0026910 A1 Jan. 27, 2022

Related U.S. Application Data

(63) Continuation of application No. 16/009,572, filed on Jun. 15, 2018, now Pat. No. 11,169,528.

(60) Provisional application No. 62/670,330, filed on May 11, 2018.

(51) Int. Cl.
G05D 1/02 (2020.01)
G01C 21/34 (2006.01)
G05D 1/00 (2006.01)

(52) U.S. Cl.
CPC ....... *G05D 1/0214* (2013.01); *G01C 21/3461* (2013.01); *G05D 1/0088* (2013.01)

(58) Field of Classification Search
CPC .. G05D 1/0214; G05D 1/0088; G05D 1/0217; G05D 2201/0213; G01C 21/3461; B60W 60/00276; B60W 60/0011; B60W 2720/103
See application file for complete search history.

(56) References Cited

U.S. PATENT DOCUMENTS

| | | |
|---|---|---|
| 2015/0346723 A1 | 12/2015 | Pedersen |
| 2017/0132934 A1 | 5/2017 | Kentley |
| 2018/0196436 A1 | 7/2018 | Gupta |

(Continued)

*Primary Examiner* — Russell Frejd
(74) *Attorney, Agent, or Firm* — Dority & Manning, P.A.

(57) ABSTRACT

Generally, the present disclosure is directed to systems and methods that include or otherwise leverage an iterative solver as part of optimizing a motion plan for an autonomous vehicle (AV). In particular, a scenario generator within a motion planning system can include a warm start generator configured to determine an initial trajectory that respects the dynamics of the autonomous vehicle and that closely tracks a speed profile determined by a constraint solver and one or more nominal paths determined by a route selector. A decision validator can analyze speed profiles and nominal paths to identify potential inconsistencies and validate a decision before optimization and execution. An initial trajectory can be further optimized by an iterative solver to determine an optimized trajectory for execution as a motion plan for the autonomous vehicle.

20 Claims, 7 Drawing Sheets

(56) References Cited

U.S. PATENT DOCUMENTS

2018/0284768 A1  10/2018  Wilkinson
2018/0348767 A1  12/2018  Tafti
2019/0235513 A1* 8/2019  Li .......................... G01C 21/34

* cited by examiner

INITIAL TRAJECTORY GENERATOR FOR MOTION PLANNING SYSTEM OF AUTONOMOUS VEHICLES

PRIORITY CLAIM

This application is a continuation of U.S. patent application Ser. No. 16/009,572 filed on Jun. 15, 2018, and now issued as U.S. Pat. No. 11,169,528, which claims priority to U.S. Patent Application Ser. No. 62/670,330, filed May 11, 2018, and entitled "INITIAL TRAJECTORY GENERATOR FOR MOTION PLANNING SYSTEM OF AUTONOMOUS VEHICLES," all of which are incorporated by reference herein in their entirety for all purposes.

FIELD

The present disclosure relates generally to autonomous vehicles. More particularly, the present disclosure relates to autonomous vehicles that feature a motion planning system with an initial trajectory generator.

BACKGROUND

An autonomous vehicle is a vehicle that is capable of sensing its environment and navigating with minimal or no human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path through such surrounding environment.

SUMMARY

Aspects and advantages of embodiments of the present disclosure will be set forth in part in the following description, or can be learned from the description, or can be learned through practice of the embodiments.

An example aspect of the present disclosure is directed to a computing system that controls an autonomous vehicle. The computing system includes a constraint solver, a route selector, a warm start generator, an optimization planner, and a vehicle controller. The constraint solver is configured to determine a plurality of speed profiles for a corresponding plurality of candidate maneuvers for implementation by an autonomous vehicle. Each of the plurality of speed profiles is determined to satisfy a plurality of constraints associated with travel by the autonomous vehicle. The route selector is configured to determine a selected maneuver from the plurality of candidate maneuvers, the selected maneuver being associated with one or more nominal paths for travel. The warm start generator is configured to determine an initial trajectory based on the selected maneuver and the speed profile associated with the selected maneuver. The initial trajectory includes location and speed information over time for travel along the one or more nominal paths. The optimization planner is configured to determine an optimized trajectory based at least in part on the initial trajectory. The vehicle controller is configured to control motion of the autonomous vehicle based at least in part on the optimized trajectory.

Another example aspect of the present disclosure is directed to a computer-implemented method. The method includes determining, by a computing system comprising one or more computing devices, a plurality of speed profiles for a corresponding plurality of candidate maneuvers for implementation by an autonomous vehicle. Each of the plurality of speed profiles is determined to satisfy a plurality of constraints associated with travel by the autonomous vehicle. The method includes determining, by the computing system, a selected maneuver from the plurality of candidate maneuvers, the selected maneuver being associated with one or more nominal paths for travel. The method includes determining, by the computing system, an initial trajectory based on the selected maneuver and the speed profile associated with the selected maneuver. The initial trajectory includes location and speed information over time for travel along the one or more nominal paths. The method includes determining, by the computing system, an optimized trajectory based at least in part on the initial trajectory. The optimized trajectory is determined by an iterative solver configured to identify a motion plan that optimizes a total cost associated with the motion plan. The method includes controlling, by the computing system, motion of the autonomous vehicle based at least in part on the optimized trajectory.

Another example aspect of the present disclosure is directed to an autonomous vehicle that includes one or more processors and one or more non-transitory computer-readable media that collectively store instructions that, when executed by the one or more processors, cause the one or more processors to perform operations. The operations include determining a plurality of speed profiles for a corresponding plurality of candidate maneuvers for implementation by an autonomous vehicle. Each of the plurality of speed profiles is determined to satisfy a plurality of constraints associated with travel by the autonomous vehicle. The operations include determining a selected maneuver from the plurality of candidate maneuvers, the selected maneuver being associated with one or more nominal paths for travel. The operations include determining an initial trajectory based on the selected maneuver and the speed profile associated with the selected maneuver. The initial trajectory includes location and speed information over time for travel along the one or more nominal paths. The operations include determining an optimized trajectory based at least in part on the initial trajectory. The optimized trajectory is determined by an iterative solver configured to identify a motion plan that optimizes a total cost associated with the motion plan. The operations include controlling motion of the autonomous vehicle based at least in part on the optimized trajectory.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
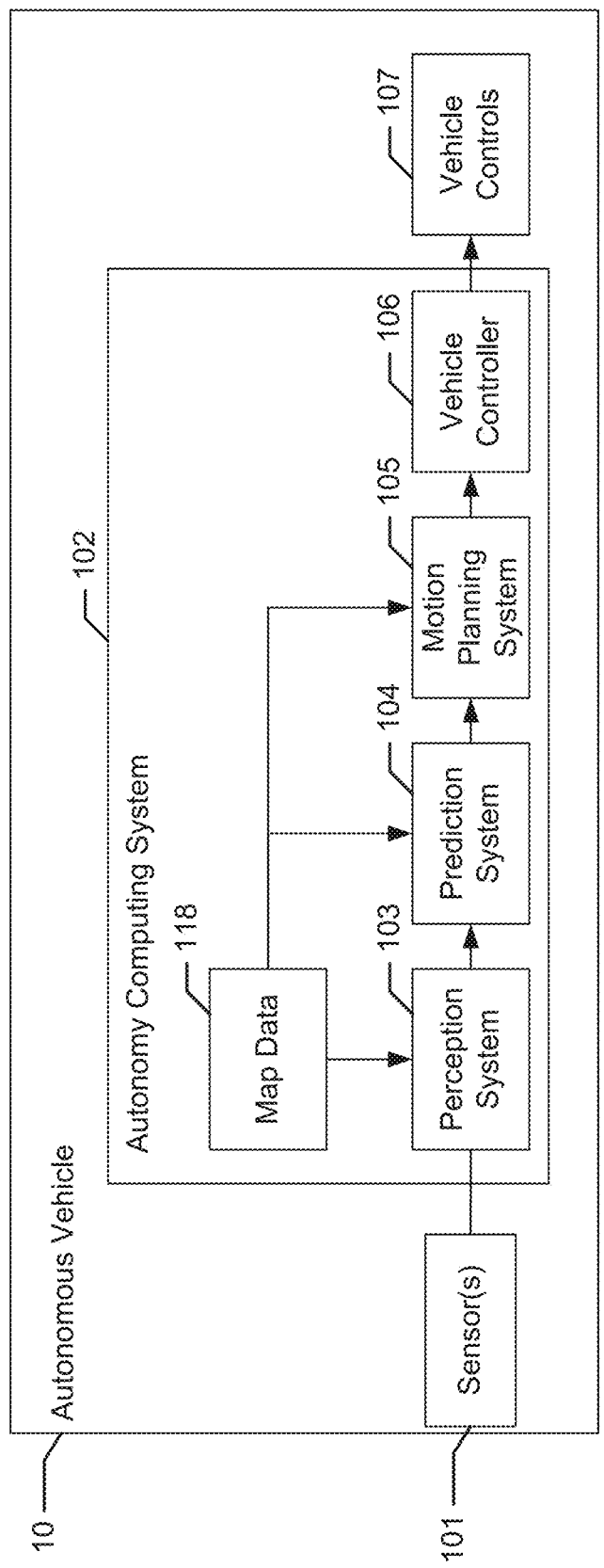
FIG. 1 depicts a block diagram of an example autonomous vehicle according to example embodiments of the present disclosure.

Generally, the present disclosure is directed to systems and methods that include or otherwise leverage an iterative solver as part of optimizing a motion plan for an autonomous vehicle (AV). In particular, a scenario generator within a motion planning system can include a warm start generator configured to determine an initial trajectory that respects the dynamics of the autonomous vehicle and that closely tracks a speed profile determined by a constraint solver and one or more nominal paths determined by a route selector. A decision validator can analyze speed profiles and nominal paths to identify potential inconsistencies and validate a decision before optimization and execution. An initial trajectory can be further optimized by an iterative solver to determine an optimized trajectory for execution as a motion plan for the autonomous vehicle. By including a warm start generator to determine an initial trajectory and to implement decision validation, robustness of the motion planning system can be improved, especially in situations when the world state changes dramatically between the last and current processing cycles. The motion of the autonomous vehicle can be controlled in accordance with the motion plan, thus providing improved autonomous vehicle driving performance (e.g., safety, comfort, etc.) in various situations which require consistent navigation decisions to be made relative to multiple factors.

More particularly, in some implementations, an autonomous vehicle can be a ground-based autonomous vehicle (e.g., car, truck, bus, etc.), an air-based autonomous vehicle (e.g., airplane, drone, helicopter, or other aircraft), or other types of vehicles (e.g., watercraft, rail-based vehicles, etc.). The autonomous vehicle can include an autonomy computing system that assists in controlling the autonomous vehicle. In some implementations, the autonomy computing system can include a perception system, a prediction system, and a motion planning system that cooperate to perceive the surrounding environment of the autonomous vehicle and determine a motion plan for controlling the motion of the autonomous vehicle accordingly.

In particular, in some implementations, the perception system can receive sensor data from one or more sensors that are coupled to or otherwise included within the autonomous vehicle. As examples, the one or more sensors can include a Light Detection and Ranging (LIDAR) system, a Radio Detection and Ranging (RADAR) system, one or more cameras (e.g., visible spectrum cameras, infrared cameras, etc.), a positioning system (e.g., GPS), and/or other sensors. The sensor data can include information that describes the location of objects within the surrounding environment of the autonomous vehicle. For example, the objects can include traffic signals, additional vehicles, pedestrians, bicyclists, and/or other objects. The sensor data can include raw sensor data and/or data that has been processed or manipulated in some manner before being provided to other systems within the autonomy computing system.

In addition to the sensor data, the perception system can retrieve or otherwise obtain map data that provides detailed information about the surrounding environment of the autonomous vehicle. The map data can provide information regarding: the identity and location of different roadways, road segments, buildings, or other items; the location and directions of traffic lanes (e.g., the location and direction of a parking lane, a turning lane, a bicycle lane, or other lanes within a particular roadway); traffic control data (e.g., the location, timing, and/or instructions of signage (e.g., stop sign or yield sign), traffic lights (e.g., stop light), or other traffic signals or control devices/markings (e.g., cross walks)); and/or any other map data that provides information that assists the computing system in comprehending and perceiving its surrounding environment and its relationship thereto.

The perception system can identify one or more objects that are proximate to the autonomous vehicle based on sensor data received from the one or more sensors and/or the map data. In particular, in some implementations, the perception system can provide, for one or more of the objects, state data that describes a current state of such object. As examples, the state data for each object can describe an estimate of the object's: current location (also referred to as position); current speed (also referred to as velocity); current acceleration, current heading; current orientation; size/footprint (e.g., as represented by a bounding polygon); class (e.g., vehicle vs. pedestrian vs. bicycle), and/or other state information.

The prediction system can receive the state data and can predict one or more future locations for the object(s) identified by the perception system. For example, various prediction techniques can be used to predict the one or more future locations for the object(s) identified by the perception system. The prediction system can provide the predicted future locations of the objects to the motion planning system. In some implementations, predictions are provided only for objects of certain class(es).

The motion planning system can determine a motion plan for the autonomous vehicle based at least in part on the state data provided by the perception system and/or the predicted one or more future locations for the objects. Stated differently, given information about the current locations of proximate objects and/or predictions about the future locations of proximate objects, the motion planning system can determine a motion plan for the autonomous vehicle that best navigates the vehicle relative to the objects at their current and/or future locations. As one example, the motion planning system can include a trajectory generator that generates a planned trajectory (e.g., a motion plan) for the autonomous vehicle.

As an example, in some implementations, the motion planning system operates to generate a new motion plan for the autonomous vehicle multiple times per second. Each new motion plan can describe motion of the autonomous vehicle over a planning window that spans the next several seconds (e.g., 5 seconds). Thus, in some example implementations, the motion planning system continuously operates to revise or otherwise generate a short-term motion plan based on the currently available data.

In some implementations, the motion planning system (e.g., the trajectory generator) can include an optimization planner that, for each instance of generating a new motion plan, searches (e.g., iteratively searches) over a motion planning space (e.g., a vehicle state space) to identify a motion plan that optimizes (e.g., locally optimizes) a total cost associated with the motion plan, as provided by one or more cost functions. For example, the motion plan can include a series of vehicle states and/or a series of controls to achieve the series of vehicle states. A vehicle state can include the autonomous vehicle's current location (also referred to as position); current speed (also referred to as velocity); current acceleration, current heading; current orientation; and/or other state information. As an example, in some implementations, the optimization planner can be or include an iterative linear quadratic regulator or similar iterative solver.

Once the optimization planner has identified the optimal motion plan (or some other iterative break occurs), the optimal motion plan can be selected and executed by the autonomous vehicle. For example, the motion planning system can provide the selected motion plan to a vehicle controller that controls one or more vehicle controls (e.g., actuators that control gas flow, steering, braking, etc.) to execute the selected motion plan until the next motion plan is generated.

In some implementations, the motion planning system can employ or otherwise include one or more cost functions that, when evaluated, provide a total cost for a particular motion plan. The optimization planner can search over a motion planning space (e.g., a vehicle state space) to identify a motion plan that optimizes (e.g., locally optimizes) the total cost provided by the one or more cost functions. Example cost functions can include a portion that provides a cost (e.g., through increased cost penalization) that discourages an autonomous vehicle from selecting motion plans that come undesirably close to objects or that implement undesired speeds and/or maneuvers. Furthermore, in some implementations, the cost function(s) can include a portion that provides a reward rather than a cost. For example, the reward can be of opposite sign to cost(s) provided by other portion(s) of the cost function. Example rewards can be provided for distance traveled, velocity, or other forms of progression toward completion of a route. In one example implementation, the total cost equals the sum of all costs minus the sum of all rewards and the optimization planner attempts to minimize the total cost. The cost functions can be evaluated by a penalty/reward generator.

In some implementations, different cost function(s) can be used depending upon a particular scenario that is selected by the motion planning system. In particular, in some implementations, the motion planning system can include a scenario generator that determines certain scenarios (e.g., a changing lanes scenario versus a queueing scenario) and guides the behavior of the autonomous vehicle according to the selected scenario. Different sets of one or more cost functions can correspond to the different possible scenarios and the cost function(s) corresponding to the selected scenario can be loaded and used by the motion planning system (e.g., the trajectory generator) at each instance of motion planning.

Thus, in some implementations, the motion planner or other portion of the autonomy computing system can include one or more scenario generators that make discrete decisions regarding control of the autonomous vehicle according to different driving scenarios. In some implementations, a scenario generator can include a constraint solver, a route selector, and a warm start generator. The output of the scenario generator can correspond to a scenario represented by an initial trajectory that is determined relative to perceived objects and corresponding constraints. The initial trajectory can be communicated to the optimization planner, which can determine a motion plan optimized over a motion planning space defined by the initial trajectory.

With more particular reference to one aspect of the scenario generator, the constraint solver can be configured to determine a plurality of speed profiles for a plurality of candidate maneuvers for implementation by an autonomous vehicle. Each of the plurality of speed profiles can be determined to satisfy a plurality of constraints generated for travel of the autonomous vehicle. Each candidate maneuver can provide a consistent solution across all constraints.

In some implementations, the constraints can be generated relative to one or more objects of interest having a predetermined manner of interaction with the autonomous vehicle and/or one or more performance objectives associated with operation of the autonomous vehicle. Objects of interest, can include, for example, one or more of a vehicle, a pedestrian, a bicycle, a traffic light, a stop sign, a crosswalk, and a speed zone.

In some implementations, constraints can be generated relative to one or more nominal paths associated with an autonomous vehicle. A nominal path, for example, may correspond to a predetermined potential path for an autonomous vehicle. As an example, in some instances, nominal paths can generally correspond to common patterns of vehicle travel along one or more lanes (e.g., lanes on a roadway or other travelway). As one example, a nominal path can generally describe a path by which a vehicle or other object may: continue according to its current lane; merge from its current lane into an adjacent lane; turn from the current lane into an adjacent road portion; or other pathways that correspond to other driving actions. In some implementations, nominal paths can be defined relative to map data associated with various roadways, road portions or segments, lanes, or the like. For example, nominal paths can be defined as a center line or other line parallel or in some predetermined relationship relative to such roadways, road portions or segments, lanes, or the like.

In some implementations, each constraint generated relative to an object of interest and/or performance objective can be defined as a constraint area in multi-dimensional space identifying regions along one or more nominal paths that an autonomous vehicle cannot be at certain times. In other words, each candidate maneuver considered by the constraint solver can be configured to represent a path through the multi-dimensional space that does not include the constraint areas. In some examples, the multi-dimensional space (e.g., a path time (PT) space) can include at least a time dimension and a distance dimension relative to travel along the one or more nominal paths. Generally, each constraint area can identify regions along the nominal path that an autonomous vehicle cannot be at certain times. In some implementations, each constraint area can be defined by one or more of a start time when the constraint begins, a stop time when the constraint ends, a start distance along the nominal path when the constraint begins, a stop distance along the nominal path when the constraint ends, and/or a maximum velocity that an autonomous vehicle can travel through the constraint area.

In some implementations, constraints can be generated for the time dimension corresponding to a certain time period (e.g. a ten second time period) that includes a plurality of time steps (e.g., one second time intervals or less). In some implementations, constraints are generated based on how objects are classified according to each respective time step. For example, an object can be considered a blocking object during a first time step (t0, t1) but a non-blocking object during a second time step (t1, t2). As such, at each time step during a time period, an autonomy computing system can classify an object (e.g., by determining if the object is or is not blocking a lane) and generate a corresponding constraint based on the classification.

In some implementations, the constraint generator can be configured to generate one or more speed regressors. A speed regressor can be defined as a constraint area within multi-dimensional space in which an AV can travel, but with limitations on AV travel speed. As such, areas can defined within multi-dimensional space that control how fast an AV travels relative to specific areas in space and time (e.g., areas corresponding to other objects, areas corresponding to specific locations on a map, areas associated with a particular maneuver of the AV at a given time, etc.)

During a lane change maneuver, a scenario generator in accordance with a motion planning system can be configured to perform certain steps and functions in different phases. For example, in some implementations, a different multi-dimensional space (e.g., a path time space) can be determined for each phase of a plurality of different phases of a lane change maneuver associated with at least first and second lanes. In some implementations, the plurality of different phases of the lane change maneuver can include a first phase when the autonomous vehicle operates within the boundaries of the first lane, a second phase when the autonomous vehicle has partially crossed a lane boundary between the first lane and the second lane and is in transition from the first lane into the second lane, and a third phase when the autonomous vehicle has completely moved into the second lane and operates within the boundaries of the second lane.

For each different phase of the lane change maneuver, the scenario generator can be configured to implement respective steps. More particularly, in one implementation, for each different phase of the lane change maneuver, a scenario generator can be configured to determine one or more objects of interest having a predetermined manner of interaction with the first and second lanes during the phase. The scenario generator can be configured to generate a constraint for each of the one or more objects of interest. Each constraint can identify a constraint area along the nominal path that the autonomous vehicle cannot be during the phase of the lane change maneuver. The scenario generator can be configured to determine a portion of the multi-dimensional space including corresponding constraints that applies to a respective timeframe associated with the phase.

In accordance with the lane change representation, the respective portions of the multi-dimensional space including corresponding constraints for each phase of the plurality of different phases of the lane change maneuver can be combined to create a temporally multiplexed space. For example, the temporally multiplexed space can have a first portion corresponding to the first phase of the lane change, a second portion corresponding to the second phase of the lane change, and a third portion corresponding to the third phase of the lane change. Each of these portions can be successively multiplexed across the time dimension of the multi-dimensional space in which various constraints are defined. A set of candidate maneuvers can then be determined relative to the one or more objects of interest across the different phases and corresponding timespans of the multiplexed space. A selected maneuver can be determined from the set of candidate maneuvers through a portion of the multiplexed space that does not include the constraint areas. An initial trajectory can then be determined from the selected maneuver and its associated speed profile for relay to an optimization planner to generate a motion plan for controlling the AV.

With more particular reference to another aspect of the scenario generator, the route selector can be configured to determine a selected maneuver from the plurality of candidate maneuvers. Each maneuver can be associated with one or more nominal paths for travel by the autonomous vehicle. For example, when a maneuver involves an autonomous vehicle staying in its current lane, that maneuver can be associated with a single nominal path. However, if a maneuver involves a lane change, then the maneuver can include at least one nominal path associated with its initial lane of travel and one nominal path associated with the target lane of travel, and optionally a nominal path associated with the transition between the initial lane and the target lane.

In some implementations, the route selector can be configured to employ a rollout method to determine a selected maneuver from the plurality of candidate maneuvers. A score for each candidate maneuver in the set of candidate maneuvers can be generated, and a selected maneuver can be determined based at least in part on the scores for each candidate maneuver in the set of candidate maneuvers and on the relative need or preference for each type of candidate maneuver (e.g., the urgency to change lanes now as opposed to staying in a current lane). The score generated for each candidate maneuver can include one or more scoring factors, including but not limited to costs, discounts and/or rewards associated with aspects of a candidate maneuver for use in evaluation of a cost function or other scoring equation. Example scoring factors can include, for example, a dynamics cost for given dynamics (e.g., jerk, acceleration) associated with the candidate maneuver, a buffer cost associated with proximity of a candidate maneuver to one or more constraints within the multi-dimensional space, a constraint violation cost associated with violating one or more constraints, a reward or discount for one or more achieved performance objectives (e.g., distance traveled), a blind spot cost associated with a candidate maneuver that involves spending time in a blind spot of other actors (e.g., other vehicles).

With more particular reference to another aspect of the scenario generator, the warm start generator can include an initial trajectory generator configured to determine an initial trajectory based on the selected maneuver (e.g., the selected maneuver determined by the route selector) and the speed profile associated with the selected maneuver (e.g., the speed profile determined by the constraint solver). The initial trajectory can include location and speed information over time for travel along the one or more nominal paths associated with the selected maneuver. As such, the initial trajectory can include state information for the vehicle over time, for states including location and speed. In some implementations, such as when an output of the route selector and/or the constraint solver is unavailable at a given cycle, the warm start generator can determine an initial trajectory by translating forward in time a current driving speed and steering angle of the autonomous vehicle.

In some implementations, the warm start generator can include a decision validator configured to determine one or more validation parameters by evaluating the initial trajectory relative to a dynamics equation for the autonomous vehicle. The validation parameter(s) can help determine whether the initial trajectory is implementable (e.g., physically feasible) by the autonomous vehicle. The validation parameter(s) can thus provide a quantitative indication of whether it is possible for the vehicle to increase and/or decrease speed and/or implement a steering turn that is within reasonable tolerance values for vehicle dynamics. In some implementations, subsequent optimization of an initial trajectory by an optimization planner is implemented after the validation parameter is determined to meet one or more predetermined validation criteria. In one example, the predetermined validation criteria can correspond to the validation parameter(s) having a particular discrete value. In another example, the predetermined validation criteria can correspond to the validation parameter(s) having a value determined in a continuous range such that the value falls above or below some predetermined threshold level. In some implementations, the warm start generator can be configured to generate and/or transmit a notification signal when the validation parameter(s) is determined to not meet the predetermined validation criteria.

With more particular reference to the optimization planner, the optimization planner can include an iterative solver that searches over a motion planning space to identify a trajectory or motion plan that optimizes (e.g., locally optimizes) a total cost associated with the motion plan, as provided by one or more cost functions. In some implementations, the optimization planner can include an iterative linear quadratic regulator configured to optimize the initial trajectory relative to multiple space dimensions (e.g., a lateral dimension associated with steering of the AV as well as a longitudinal dimension associated with braking/acceleration of the AV) for a given period of time.

In some implementations, the optimization planner can include one or more gain controllers configured to determine one or more gains. The gains determined by the one or more gain controllers can include, for example, one or more of a proportional gain, an integral action gain, or a derivative action gain associated with one or more parameters of a trajectory. For example, an optimization planner can determine one or more gains associated with a lateral command and one or more gains associated with a longitudinal command. The lateral command can control lateral movement of an autonomous vehicle by controlling a steering actuator. The longitudinal command can control longitudinal movement of an autonomous vehicle by controlling braking and/or accelerator actuators.

The autonomy computing system can control the autonomous vehicle to implement the motion plan embodied by the initial trajectory and/or the optimized trajectory. For example, the motion planning system can provide the selected motion plan to a vehicle controller that controls one or more vehicle controls (e.g., actuators that control gas flow, steering, braking, etc.) to execute the selected motion plan until the next motion plan is generated.

The systems, methods, and vehicles described herein may provide a number of technical effects and benefits. By providing a warm start generator configured to determine an initial trajectory for relay to an optimization planner within a motion planning system, the performance of the motion planning system can be improved. More particularly, the performance of the optimization planner, which is sensitive to having a good initial trajectory is enhanced. Initial trajectories determined in accordance with the disclosed technology (e.g., an initial trajectory determined from a speed profile determined by a constraint solver and a selected maneuver determined by the route selector) provide more comprehensive state information than other initial trajectories. This comprehensive state information can capture situations in which the world state changes dramatically between the last and current processing cycles, thus avoiding potential situations where the optimization planner fails to converge or converges to an incorrect trajectory. By generating an initial trajectory in accordance with the disclosed technology, an initial trajectory can be determined that guides the optimization planner to find a good local minimum and reduces the optimization planner's convergence time. As such, a trajectory can be determined that is close to the optimal solution, thus improving the overall performance of the autonomous vehicle and experience for passengers thereof.

The systems, methods, and vehicles described herein also provide a framework for determining a set of navigation decisions that are consistent across multiple constraints that can be simultaneously represented within a multi-dimensional space. Because of the unique manner in which multiple constraints can be represented in multi-dimensional space, situations can be avoided whereby a given classifier in a scenario generator could potentially generate a navigation decision that conflicts with a separate classifier. In particular, a framework is provided by which AV behavior relative to objects of interest, fixed locations on a map, and/or speed limitations can all be simultaneously represented in a single computational framework. This allows initial trajectories and/or optimized trajectories to be determined that account for multiple dynamically shifting factors that may arise during AV navigation.

The systems, methods, and vehicles described herein also enable the vehicle computing system to locally (e.g., onboard the vehicle) detect an object, evaluate its features (e.g., speed, location, path) relative to the vehicle and/or the surroundings, and determine a motion plan of the vehicle accordingly. By performing such an operation on-board the autonomous vehicle, the vehicle computing system can avoid the latency issues that arise by communicating with a remote computing system. The vehicle computing system can be configured to continuously perform this iterative optimization process as the vehicle travels and different objects become proximate to the autonomous vehicle. As such, the vehicle computing system can proactively control the motion of the autonomous vehicle to avoid sudden movements that place stress on the vehicle's systems and confuse or frighten users (e.g., passengers of the vehicle). Moreover, the autonomous vehicle can operate in a manner that is safer for the objects in the vehicle's surroundings.

The systems, methods, and vehicles described herein also provide an improvement to vehicle computing technology, such as autonomous vehicle computing technology. For instance, aspects of the present disclosure enable a vehicle computing system to more efficiently and accurately control the vehicle's motion. For example, the systems and methods of the present disclosure can allow one or more computing devices on-board an autonomous vehicle to determine a scenario and motion plan for the autonomous vehicle that reduce processing cycles in an optimization planner, thus improve processing speed and decision making in an autonomy computing system.

With reference now to the figures, example embodiments of the present disclosure will be discussed in further detail.

FIG. 1 depicts a block diagram of an example autonomous vehicle 10 according to example embodiments of the present disclosure. The autonomous vehicle 10 is capable of sensing its environment and navigating without human input. The autonomous vehicle 10 can be a ground-based autonomous vehicle (e.g., car, truck, bus, etc.), an air-based autonomous vehicle (e.g., airplane, drone, helicopter, or other aircraft), or other types of vehicles (e.g., watercraft, rail-based vehicles, etc.).

The autonomous vehicle 10 includes one or more sensors 101, an autonomy computing system 102, and one or more vehicle controls 107. The autonomy computing system 102 can assist in controlling the autonomous vehicle 10. In particular, the autonomy computing system 102 can receive sensor data from the one or more sensors 101, attempt to comprehend the surrounding environment by performing various processing techniques on data collected by the sensors 101, and generate an appropriate motion plan through such surrounding environment. The autonomy computing system 102 can control the one or more vehicle controls 107 to operate the autonomous vehicle 10 according to the motion plan.

As illustrated in FIG. 1, the autonomy computing system 102 can include a perception system 103, a prediction system 104, and a motion planning system 105 that cooperate to perceive the surrounding environment of the autonomous vehicle 10 and determine a motion plan for controlling the motion of the autonomous vehicle 10 accordingly.

In particular, in some implementations, the perception system 103 can receive sensor data from the one or more sensors 101 that are coupled to or otherwise included within the autonomous vehicle 10. As examples, the one or more sensors 101 can include a Light Detection and Ranging (LIDAR) system, a Radio Detection and Ranging (RADAR) system, one or more cameras (e.g., visible spectrum cameras, infrared cameras, etc.), and/or other sensors. The sensor data can include information that describes the location of objects within the surrounding environment of the autonomous vehicle 10.

As one example, for a LIDAR system, the sensor data can include the location (e.g., in three-dimensional space relative to the LIDAR system) of a number of points that correspond to objects that have reflected a ranging laser. For example, a LIDAR system can measure distances by measuring the Time of Flight (TOF) that it takes a short laser pulse to travel from the sensor to an object and back, calculating the distance from the known speed of light.

As another example, for a RADAR system, the sensor data can include the location (e.g., in three-dimensional space relative to the RADAR system) of a number of points that correspond to objects that have reflected a ranging radio wave. For example, radio waves (e.g., pulsed or continuous) transmitted by the RADAR system can reflect off an object and return to a receiver of the RADAR system, giving information about the object's location and speed. Thus, a RADAR system can provide useful information about the current speed of an object.

As yet another example, for one or more cameras, various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in imagery captured by the one or more cameras. Other sensor systems can identify the location of points that correspond to objects as well.

As another example, the one or more sensors 101 can include a positioning system. The positioning system can determine a current position of the autonomous vehicle 10. The positioning system can be any device or circuitry for analyzing the position of the autonomous vehicle 10. For example, the positioning system can determine position by using one or more of inertial sensors, a satellite positioning system, based on IP address, by using triangulation and/or proximity to network access points or other network components (e.g., cellular towers, WiFi access points, etc.) and/or other suitable techniques. The position of the autonomous vehicle 10 can be used by various systems of the autonomy computing system 102.

Thus, the one or more sensors 101 can be used to collect sensor data that includes information that describes the location (e.g., in three-dimensional space relative to the autonomous vehicle 10) of points that correspond to objects within the surrounding environment of the autonomous vehicle 10.

In addition to the sensor data, the perception system 103 can retrieve or otherwise obtain map data 118 that provides detailed information about the surrounding environment of the autonomous vehicle 10. The map data 118 can provide information regarding: the identity and location of different travelways (e.g., roadways), road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travelway); traffic control data (e.g., the location and instructions of signage, traffic lights, or other traffic control devices); and/or any other map data that provides information that assists the autonomy computing system 102 in comprehending and perceiving its surrounding environment and its relationship thereto.

The perception system 103 can identify one or more objects that are proximate to the autonomous vehicle 10 based on sensor data received from the one or more sensors 101 and/or the map data 118. In particular, in some implementations, the perception system 103 can determine, for each object, state data that describes a current state of such object. As examples, the state data for each object can describe an estimate of the object's: current location (also referred to as position); current speed (also referred to as velocity); current acceleration; current heading; current orientation; size/footprint (e.g., as represented by a bounding shape such as a bounding polygon or polyhedron); class (e.g., vehicle versus pedestrian versus bicycle versus other); yaw rate; and/or other state information.

In some implementations, the perception system 103 can determine state data for each object over a number of iterations. In particular, the perception system 103 can update the state data for each object at each iteration. Thus, the perception system 103 can detect and track objects (e.g., vehicles) that are proximate to the autonomous vehicle 10 over time.

The prediction system 104 can receive the state data from the perception system 103 and predict one or more future locations for each object based on such state data. For example, the prediction system 104 can predict where each object will be located within the next 5 seconds, 10 seconds, 20 seconds, etc. As one example, an object can be predicted to adhere to its current trajectory according to its current speed. As another example, other, more sophisticated prediction techniques or modeling can be used.

The motion planning system 105 can determine a motion plan for the autonomous vehicle 10 based at least in part on the predicted one or more future locations for the object and/or the state data for the object provided by the perception system 103. Stated differently, given information about the current locations of proximate objects and/or predicted future locations of proximate objects, the motion planning system 105 can determine a motion plan for the autonomous vehicle 10 that best navigates the autonomous vehicle 10 relative to the objects at their current and/or future locations. As one example, the motion planning system 105 can generate a planned trajectory (e.g., a motion plan) for the autonomous vehicle 10.

As an example, in some implementations, the motion planning system 105 operates to generate a new autonomous motion plan for the autonomous vehicle 10 multiple times per second. Each new autonomous motion plan can describe motion of the autonomous vehicle 10 over a planning window that spans the next several seconds (e.g., 5 seconds). Thus, in some example implementations, the motion planning system 105 continuously operates to revise or otherwise generate a short-term motion plan based on the currently available data.

In particular, according to an aspect of the present disclosure, the motion planning system 105 can evaluate one or more cost functions for each of one or more candidate motion plans for the autonomous vehicle 10. For example, the cost function(s) can describe a cost (e.g., over time) of adhering to a particular candidate motion plan and/or describe a reward for adhering to the particular candidate motion plan. For example, the reward can be of opposite sign to the cost.

More particularly, to evaluate the one or more cost functions, the motion planning system 105 can determine a plurality of features that are within a feature space. For example, the status of each feature can be derived from the state of the vehicle and/or the respective states of other objects or aspects of the surrounding environment.

The motion planning system 105 can determine the plurality of features for each vehicle state included in the current candidate motion plan. The motion planning system 105 can determine the plurality of features for each vehicle state included in the candidate motion plan.

The motion planning system 105 can evaluate one or more cost functions based on the determined features. For example, in some implementations, the one or more cost functions can include a respective linear cost for each feature at each state.

The motion planning system 105 can iteratively optimize the one or more cost functions to minimize a total cost associated with the candidate motion plan. For example, the motion planning system 105 can include an optimization planner that iteratively optimizes the one or more cost functions.

Following optimization, the motion planning system 105 can provide the optimal motion plan (e.g., an optimized trajectory) to a vehicle controller 106 that controls one or more vehicle controls 107 (e.g., actuators or other devices that control gas flow, steering, braking, etc.) to execute the optimal motion plan.

Each of the perception system 103, the prediction system 104, the motion planning system 105, and the vehicle controller 106 can include computer logic utilized to provide desired functionality. In some implementations, each of the perception system 103, the prediction system 104, the motion planning system 105, and the vehicle controller 106 can be implemented in hardware, firmware, and/or software controlling a general purpose processor. For example, in some implementations, each of the perception system 103, the prediction system 104, the motion planning system 105, and the vehicle controller 106 includes program files stored on a storage device, loaded into a memory and executed by one or more processors. In other implementations, each of the perception system 103, the prediction system 104, the motion planning system 105, and the vehicle controller 106 includes one or more sets of computer-executable instructions that are stored in a tangible computer-readable storage medium such as RAM hard disk or optical or magnetic media.

Figure 2:
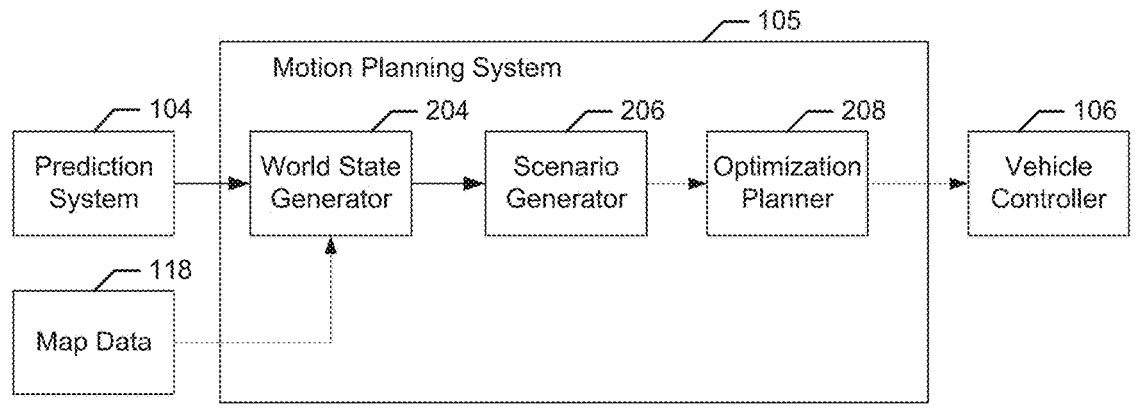
FIG. 2 depicts a block diagram of an example motion planning system according to example embodiments of the present disclosure.

FIG. 2 depicts a block diagram of an example motion planning system 105 according to example embodiments of the present disclosure. The example motion planning system 105 includes a world state generator 204, a scenario generator 206, and an optimization planner 208.

The world state generator 204 can receive information from the prediction system 104, the map data 118, and/or other information such as vehicle pose, a current route, or other information. The world state generator 204 can synthesize all received information to produce a world state that describes the state of all objects in and other aspects of the surrounding environment of the autonomous vehicle (e.g., autonomous vehicle 10) at each time step.

The scenario generator 206 can generate constraints as part of determining a motion plan for an autonomous vehicle (e.g., autonomous vehicle 10). In particular, scenario generator 206 within motion planning system 105 can generate constraints based on where objects of interest are predicted to be relative to an autonomous vehicle, such as indicated by world state generator 204. A constraint solver within scenario generator 206 can identify navigation decisions for each of the constraints that provide a consistent solution across all constraints. The solution provided by the constraint solver can be in the form of a speed profile determined relative to constraint areas for all objects of interest. The speed profile represents a set of navigation decisions such that a navigation decision relative to one constraint doesn't sacrifice an ability to satisfy a different navigation decision relative to one or more other constraints. The set of navigation decisions can then be used by optimization planner 208 within motion planning system 105 to search over a motion planning space to identify a motion plan that optimizes a total cost associated with the motion plan. More particular details associated with one example implementation of scenario generator 206 are depicted relative to FIG. 3.

The optimization planner 208 can be configured to iteratively search over a motion planning space to identify a motion plan that optimizes (e.g., locally optimizes) a total cost associated with the motion plan, as provided by one or more cost functions. For example, the motion plan can include a series of vehicle states and/or a series of controls to achieve the series of vehicle states. A vehicle state can include the autonomous vehicle's current location (also referred to as position); current speed (also referred to as velocity); current acceleration, current heading; current orientation; and/or other state information. As an example, in some implementations, the optimization planner 208 can be or include an iterative linear quadratic regulator or similar iterative solver. More particular details associated with one example implementation of optimization planner 208 are depicted relative to FIG. 4.

Once the optimization planner 208 has identified the optimal motion plan (or some other iterative break occurs), the optimal motion plan (e.g., optimized trajectory) can be selected and executed by the autonomous vehicle. For example, the motion planning system 105 can provide the selected motion plan to a vehicle controller 106 that controls one or more vehicle controls (e.g., actuators that control gas flow, steering, braking, etc.) to execute the selected motion plan until the next motion plan is generated.

Each of the world state generator 204, scenario generator 206, and optimization planner 208 can include computer logic utilized to provide desired functionality. In some implementations, each of world state generator 204, scenario generator 206, and optimization planner 208 can be implemented in hardware, firmware, and/or software controlling a general purpose processor. For example, in some implementations, each of world state generator 204, scenario generator 206, and optimization planner 208 includes program files stored on a storage device, loaded into a memory and executed by one or more processors. In other implementations, each of world state generator 204, scenario generator 206, and optimization planner 208 includes one or more sets of computer-executable instructions that are stored in a tangible computer-readable storage medium such as RAM hard disk or optical or magnetic media.

Figure 3:
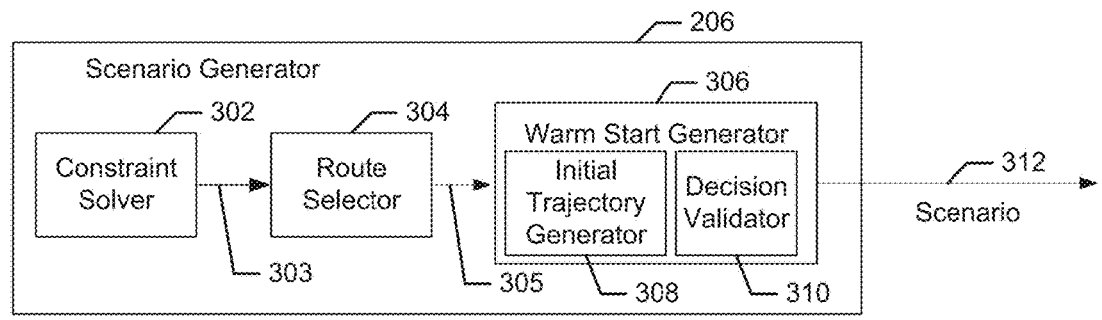
FIG. 3 depicts a block diagram of an example scenario generator according to example embodiments of the present disclosure.

FIG. 3 depicts a block diagram of an example scenario generator 206 according to example embodiments of the present disclosure. In some implementations, scenario generator 206 can include a constraint solver 302, a route selector 304, and a warm start generator 306. The output of the scenario generator 206 can correspond to a scenario 312 represented by an initial trajectory that is determined relative to perceived objects and corresponding constraints. The initial trajectory can be communicated to the optimization planner 208, which can determine a motion plan optimized over a motion planning space defined by the initial trajectory.

With more particular reference to one aspect of the scenario generator 206, the constraint solver 302 can be configured to determine a plurality of speed profiles 303 for a plurality of corresponding candidate maneuvers for implementation by an autonomous vehicle (e.g., autonomous vehicle 10 of FIG. 1). Each of the plurality of speed profiles 303 can be determined to satisfy a plurality of constraints generated for travel of the autonomous vehicle. Each candidate maneuver can provide a consistent solution across all constraints. Additional details regarding generation of constraints are discussed with reference to FIG. 5.

With more particular reference to another aspect of the scenario generator 206, the route selector 304 can be configured to determine a selected maneuver 305 from the plurality of candidate maneuvers. Each maneuver can be associated with one or more nominal paths for travel by the autonomous vehicle. For example, when a maneuver involves an autonomous vehicle staying in its current lane, that maneuver can be associated with a single nominal path. However, if a maneuver involves a lane change, then the maneuver can include at least one nominal path associated with its initial lane of travel and one nominal path associated with the target lane of travel, and optionally a nominal path associated with the transition between the initial lane and the target lane.

In some implementations, the route selector 304 can be configured to employ a rollout method to determine a selected maneuver 305 from the plurality of candidate maneuvers. A score for each candidate maneuver in the set of candidate maneuvers can be generated, and a selected maneuver 305 can be determined based at least in part on the scores for each candidate maneuver in the set of candidate maneuvers and on the relative need or preference for each type of candidate maneuver (e.g., the urgency to change lanes now as opposed to staying in a current lane). The score generated for each candidate maneuver can include one or more scoring factors, including but not limited to costs, discounts and/or rewards associated with aspects of a candidate maneuver for use in evaluation of a cost function or other scoring equation. Example scoring factors can include, for example, a dynamics cost for given dynamics (e.g., jerk, acceleration) associated with the candidate maneuver, a buffer cost associated with proximity of a candidate maneuver to one or more constraints within the multi-dimensional space, a constraint violation cost associated with violating one or more constraints, a reward or discount for one or more achieved performance objectives (e.g., distance traveled), a blind spot cost associated with a candidate maneuver that involves spending time in a blind spot of other actors (e.g., other vehicles).

With more particular reference to another aspect of the scenario generator 206, the warm start generator 306 can include an initial trajectory generator 308 configured to determine an initial trajectory based on the selected maneuver (e.g., the selected maneuver 305 determined by the route selector 304) and the speed profile associated with the selected maneuver (e.g., one of the speed profiles 303 determined by the constraint solver 302). The initial trajectory can include location and speed information over time for travel along the one or more nominal paths associated with the selected maneuver. As such, the initial trajectory can include state information for the vehicle over time, for states including location and speed. In some implementations, such as when an output of the route selector 304 and/or the constraint solver 302 is unavailable at a given cycle, the warm start generator 306 can determine an initial trajectory by translating forward in time a current driving speed and steering angle of the autonomous vehicle.

In some implementations, the warm start generator 306 can include a decision validator 310 configured to determine one or more validation parameters by evaluating the initial trajectory relative to a dynamics equation for the autonomous vehicle. The validation parameter(s) can help determine whether the initial trajectory is implementable (e.g., physically feasible) by the autonomous vehicle. The validation parameter(s) can thus provide a quantitative indication of whether it is possible for the vehicle to increase and/or decrease speed and/or implement a steering turn that is within reasonable tolerance values for vehicle dynamics. In some implementations, subsequent optimization of an initial trajectory by an optimization planner is implemented after the decision validator 310 determines that a validation parameter meets one or more predetermined validation criteria. In one example, the predetermined validation criteria can correspond to the validation parameter(s) having a particular discrete value. In another example, the predetermined validation criteria can correspond to the validation parameter(s) having a value determined in a continuous range such that the value falls above or below some predetermined threshold level. In some implementations, the warm start generator 306 can be configured to generate and/or transmit a notification signal when the validation parameter(s) is determined to not meet the predetermined validation criteria.

Figure 4:
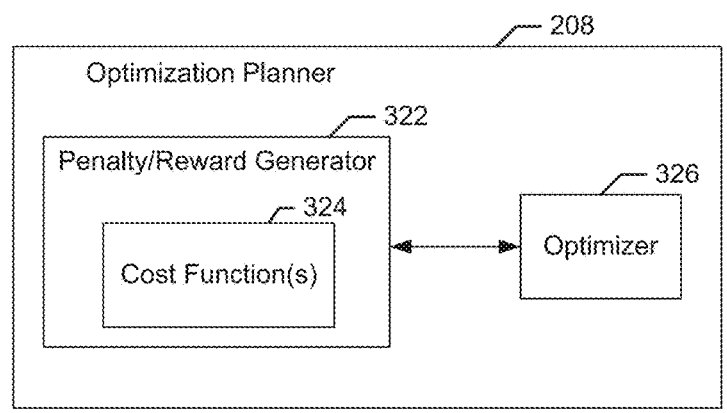
FIG. 4 depicts a block diagram of an example optimization planner according to example embodiments of the present disclosure.

FIG. 4 depicts a block diagram of an example optimization planner 208 according to example embodiments of the present disclosure. Generally, optimization planner 208 can include an iterative solver that searches over a motion planning space to identify a trajectory or motion plan that optimizes (e.g., locally optimizes) a total cost associated with the motion plan, as provided by one or more cost functions. In some implementations, the optimization planner 208 can include an iterative linear quadratic regulator configured to optimize the initial trajectory relative to multiple space dimensions (e.g., a lateral dimension associated with steering of the AV as well as a longitudinal dimension associated with braking/acceleration of the AV) for a given period of time.

According to an aspect of the present disclosure, the total cost can be based at least in part on one or more cost functions 324. In one example implementation, the total cost equals the sum of all costs minus the sum of all rewards and the optimization planner attempts to minimize the total cost. The cost functions 324 can be evaluated by a penalty/reward generator 322.

In some implementations, different cost function(s) 324 can be used depending upon a particular speed profile and/or associated set of navigation decisions represented by the speed profile as determined by scenario generator 206. The set of navigation decisions can then be used by optimization planner 208 within motion planning system 105 to search over a motion planning space to identify a motion plan that optimizes a total cost associated with the motion plan. Different sets of one or more cost functions 324 can correspond to the different navigation decisions determined by the scenario generator and penalty/reward generator 322 can load the cost function(s) 324 corresponding to the selected navigation decision(s) at each instance of motion planning.

In other implementations, the same cost function(s) 324 can be used at each instance of motion planning (e.g., no particular scenarios are used). In some implementations, the optimization planner 208 does not include the penalty/reward generator 322.

To provide an example cost function 324 for the purpose of illustration: a first example cost function can provide a first cost that is negatively correlated to a magnitude of a first distance from the autonomous vehicle to a proximate object of interest. Thus, if a candidate motion plan approaches a proximate object of interest, the first cost increases, thereby discouraging (e.g., through increased cost penalization) the autonomous vehicle from selecting motion plans that come undesirably close to the object. This first example cost function is provided only as an example cost function to illustrate the principle of cost. The first cost function is not required to implement the present disclosure. Many other and different cost functions 324 can be employed in addition or alternatively to the first cost function described above.

Furthermore, in some implementations, the cost function(s) 324 can include a portion that provides a reward rather than a cost. For example, the reward can be of opposite sign to cost(s) provided by other portion(s) of the cost function. Example rewards can be provided for distance traveled, velocity, or other forms of progressing toward completion of a route.

Each of the penalty/reward generator 322 and optimizer 326 can include computer logic utilized to provide desired functionality. In some implementations, each of penalty/reward generator 322 and optimizer 326 can be implemented in hardware, firmware, and/or software controlling a general purpose processor. For example, in some implementations, each of penalty/reward generator 322 and optimizer 326 includes program files stored on a storage device, loaded into a memory and executed by one or more processors. In other implementations, each of penalty/reward generator 322 and optimizer 326 includes one or more sets of computer-executable instructions that are stored in a tangible computer-readable storage medium such as RAM hard disk or optical or magnetic media.

In some implementations, the optimization planner 208 can include one or more gain controllers configured to determine one or more gains. The gains determined by the one or more gain controllers can include, for example, one or more of a proportional gain, an integral action gain, or a derivative action gain associated with one or more parameters of a trajectory. For example, an optimization planner 208 can determine one or more gains associated with a lateral command and one or more gains associated with a longitudinal command. The lateral command can control lateral movement of an autonomous vehicle by controlling a steering actuator. The longitudinal command can control longitudinal movement of an autonomous vehicle by controlling braking and/or accelerator actuators.

Figure 5:
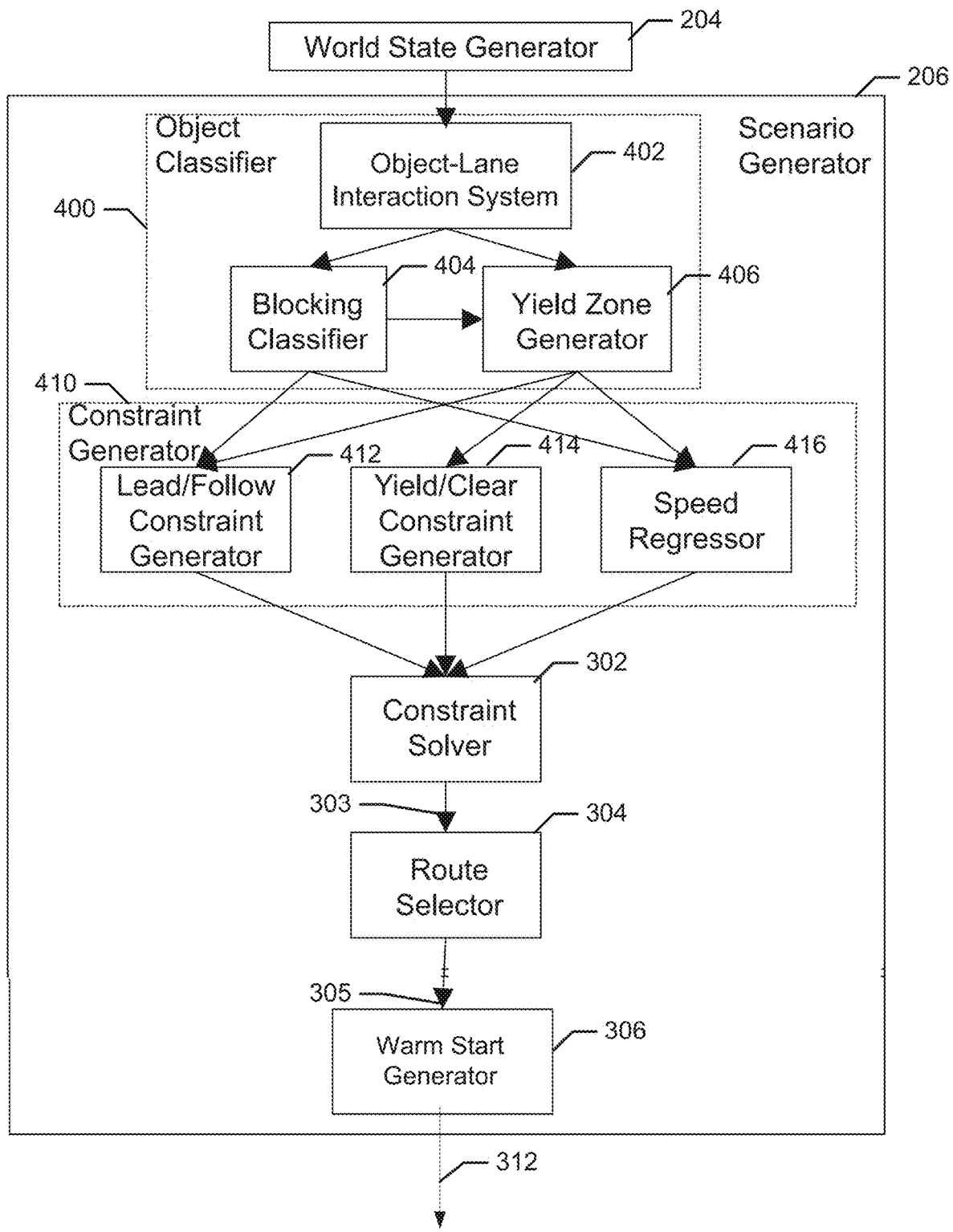
FIG. 5 depicts a block diagram of an object classifier and constraint generator associated with a constraint solver according to example embodiments of the present disclosure.

FIG. 5 depicts a block diagram of an object classifier and constraint generator associated with a constraint solver (e.g., constraint solver 302 of FIG. 3) according to example embodiments of the present disclosure. In general, scenario generator 206 can be configured to make discrete decisions regarding control of an autonomous vehicle (e.g., autonomous vehicle 10) according to different driving scenarios. In some implementations, scenario generator 206 can include an object classifier 400, a constraint generator 410, a constraint solver 302, a route selector 304, and a warm start generator 306.

In general, constraints can be generated by scenario generator 206 (e.g., via constraint generator 410) relative to one or more objects of interest determined by object classifier 400 or other system within an autonomy computing system (e.g., autonomy computing system 102 of FIG. 1) and/or one or more performance objectives associated with operation of the autonomous vehicle (e.g., autonomous vehicle 10 of FIG. 1). Objects of interest, can include, for example, one or more of a vehicle, a pedestrian, a bicycle, a traffic light, a stop sign, a crosswalk, and a speed zone.

In some implementations, an object classifier 400 can more particularly include a blocking classifier 404, a yield zone generator 406, and a side classifier 408 (as illustrated in FIG. 14).

More particularly, an object classifier 400 can make determinations based on world state data determined by an autonomy computing system (e.g., by world state generator 204). For example, the world state generator 204 can determine one or more features associated with an object and/or the surrounding environment. For example, the features can be determined based at least in part on the state data associated with the object. In some implementations, the world state generator 204 can determine the feature(s) based at least in part on other information, such as the acquired map data (e.g., map data 118). The feature(s) can be indicative of the movement (or lack thereof) and/or position of the object relative to items within the vehicle's surroundings and/or other information associated with the object. For example, the feature(s) can include a location of the object relative to a travel way (e.g., relative to the left or right lane markings), a location of the object relative to the autonomous vehicle (e.g., a distance between the current locations of the vehicle and the object), one or more characteristic(s) of the object relative to a travel route associated with the autonomous vehicle (e.g., whether the object is moving parallel, towards, or away from the vehicle's current/future travel route or a predicted point of intersection with the vehicle's travel route), etc. In some implementations, the feature(s) determined for a particular object may depend at least in part on the class of that object. For example, the predicted path for a vehicle or bicycle traveling on a roadway may be different than that associated with a pedestrian traveling on a sidewalk. World state data that includes features associated with one or more objects of interest can also be referred to as feature data.

More particularly, in some implementations, an object classifier 400 (e.g., via object-lane interaction system 402) can be configured to determine how an object of interest is interacting with a given lane. In some implementations, objects of interest can be categorized according to one or more of a predetermined set of interaction modes such as tracking (e.g., tracking with an AV in a given lane), crossing (e.g., crossing in front of an AV in a given lane), entering (e.g., entering a given lane currently occupied by an AV), exiting (e.g., exiting a given lane currently occupied by an AV), oncoming (e.g., heading towards an AV in a given lane), parked (e.g., parked in a given lane occupied by an AV), etc.

More particularly, in some implementations, a blocking classifier 404 associated with an object classifier 400 can be configured to determine one or more blocking objects based at least in part on a manner of interaction that an object of interest has with a given lane or lane sequence. In some implementations, an object of interest in a given lane can be determined to be a blocking object relative to an AV operating in the same given lane when the object of interest has a manner of interaction that provides insufficient spatial clearance and/or temporal clearance for the AV to pass the object within the lane. In some implementations, an object of interest in a given lane can be determined to be a blocking object relative to an AV operating in the same given lane when the object of interest has a manner of interaction that positions the object either ahead of or behind the AV and moving with the flow of traffic.

When an object of interest is determined by blocking classifier 404 to be a blocking object, a constraint can be generated (e.g., by constraint generator 410) for that object that requires the AV to be ahead or behind the predicted object at one or more given times. In other words, a constraint associated with a blocking object prevents an AV from being at the same longitudinal distance as the object within a given lane regardless of how far the AV shifts in the lateral direction within the lane. When a constraint for a blocking object is generated in a multi-dimensional space such as that path time space embodiment described relative to FIG. 6, a constraint area completely encompasses a lateral swath of the multi-dimensional space corresponding to a start and stop distance for all times in a given timespan along the time dimension.

More particularly, in some implementations, a yield zone generator 406 within an object classifier 400 can be configured to determine one or more yield zones. In some implementations, yield zones can be defined as a spatial and temporal region that an AV cannot be within. For example, a yield zone can be defined for intersections such as, but not limited to traffic lights, stop signs, crosswalks, etc. In another example, yield zones can be defined relative to objects of interest that are considered to be crossing actors relative to an AV (e.g., another vehicle making an unprotected left in front of the AV, a jaywalker, another vehicle turning across the AV's current lane, etc.). When crossing actors are identified, the yield zone generator 406 can thus determine a fixed area (e.g., a fixed area defined relative to a map) for ensuring that the autonomous vehicle does not stop in the area where it perceives actors to be crossing.

In some implementations, a constraint generator 410 can be configured to generate a constraint for each of the one or more objects of interest determined by the object classifier 400 (e.g., blocking objects, yield zones, etc.). Each constraint can be associated with a corresponding constraint area defined relative to a multi-dimensional space. In some implementations, the multi-dimensional space (e.g., a path time (PT) space) comprises at least a time dimension and a distance dimension relative to travel along the nominal path. Generally, each constraint area can identify regions along the nominal path that an autonomous vehicle cannot be at certain times. In some implementations, each constraint area can be defined by one or more of a start time when the constraint begins, a stop time when the constraint ends, a start distance along the nominal path when the constraint begins, a stop distance along the nominal path when the constraint ends, and/or a maximum velocity that an autonomous vehicle can travel through the constraint area.

In some implementations, constraint generator 410 can be configured to generate constraints for the time dimension corresponding to a certain time period (e.g. a ten second time period) that includes a plurality of time steps (e.g., one second time intervals or less). In some implementations, constraint generator 410 can be configured to generate constraints based on how objects are classified according to each respective time step. For example, an object can be considered a blocking object during a first time step (t0, t1) but a non-blocking object during a second time step (t1, t2). As such, at each time step during a time period, an autonomy computing system 102 can classify an object (e.g., by determining if the object is or is not blocking a lane) and generate a corresponding constraint based on the classification.

In some implementations, constraints can be generated by constraint generator 410 relative to one or more nominal paths associated with an autonomous vehicle 10. A nominal path, for example, may correspond to a predetermined potential path for an autonomous vehicle 10. As an example, in some instances, nominal paths can generally correspond to common patterns of vehicle travel along one or more lanes (e.g., lanes on a roadway or other travelway). As one example, a nominal path can generally describe a path by which a vehicle or other object may: continue according to its current lane; merge from its current lane into an adjacent lane; turn from the current lane into an adjacent road portion; or other pathways that correspond to other driving actions. In some implementations, nominal paths can be defined relative to map data associated with various roadways, road portions or segments, lanes, or the like. For example, nominal paths can be defined as a center line or other line parallel or in some predetermined relationship relative to such roadways, road portions or segments, lanes, or the like.

In some implementations, the constraint generator 410 can be further configured to generate one or more buffer zones. A buffer zone can be defined relative to a constraint to provide additional areas in the multi-dimensional space for having further clearance relative to an object of interest. In some implementations, a buffer zone associated with a given constraint corresponds to an area within multi-dimensional space that surrounds at least a portion of a constraint area within the multi-dimensional space. For example, a temporal buffer zone can be created that has a start time that is before the start time of an associated constraint and/or a stop time that is after the stop time of the associated constraint. A spatial buffer zone can be created that has as start distance that is before the start distance of an associated constraint and/or a stop distance that is after the stop distance of the associated constraint.

In some implementations, the constraint generator 410 can be further configured to generate one or more constraints by, for example, one or more of the lead/follow constraint generator 412, the yield/clear constraint generator 414 and/or the speed regressor 416. A speed regressor 416 can be defined as a constraint area within multi-dimensional space in which an AV can travel, but with limitations on AV travel speed. As such, regions can defined within multi-dimensional space that control whether an AV leads or follows an object of interest (e.g., another vehicle, whether an AV yields or clears an object of interest (e.g., a nearby pedestrian), how fast an AV travels relative to specific areas in space and time (e.g., areas corresponding to other objects, areas corresponding to specific locations on a map, areas associated with a particular maneuver of the AV at a given time, etc.)

After various constraints are generated by constraint generator 410, the constraint solver 302, route selector 304 and warm start generator 306 can function as previously described relative to FIG. 3 to determine an initial trajectory for further optimization (e.g., by optimization planner 208 of FIGS. 1 and 3).

Figure 6:
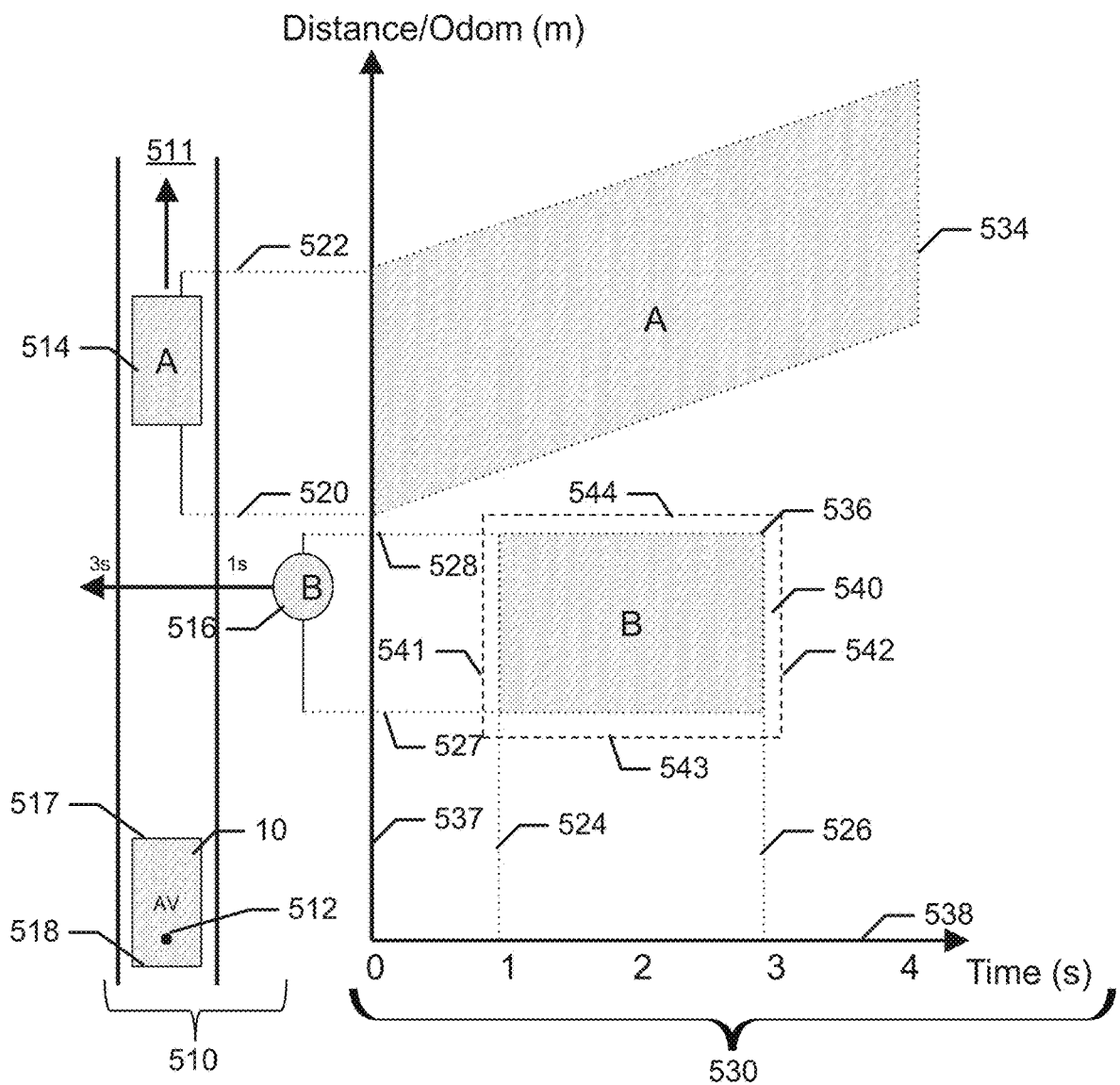
FIG. 6 depicts a graphical representation of an example multi-dimensional space for representing constraints according to example embodiments of the present disclosure.

FIG. 6 depicts a graphical representation of an example multi-dimensional space for representing constraints according to example embodiments of the present disclosure. More particularly, the left portion of FIG. 6 represents an example scenario 510 in which an autonomous vehicle 10 is traveling within a lane 511. World state data generated relative to autonomous vehicle 10 can include feature data descriptive of a first object 514 and a second object 516. Both first object 514 and second object 516 can be determined as having some sort of object-lane interaction with lane 511 which is occupied by AV 10. For example, first object 514 can be determined to be a tracking object (e.g., a vehicle traveling in the same lane 511 as AV 10 and having generally the same heading as AV 10), while second object 516 can be determined to be a crossing object (e.g., a pedestrian crossing lane 511 at one or more time steps that could interact with AV 10). Both first object 514 and second object 516 can be determined to be blocking objects at certain times.

The right portion of FIG. 6 represents an example multi-dimensional space 530 including constraint areas 534 and 536 that correspond with constraints generated for first object 514 and second object 516 respectively. The multi-dimensional space 530 of FIG. 6 corresponds to a space defined by a first dimension 537 corresponding to the path of AV 10 and a second dimension of 538 corresponding to time. More particularly, the first dimension 537 can be depicted as a distance or odometer measurement (e.g., in meters) relative to travel by AV 10 along a nominal path. When AV 10 is represented as point 512, the location of point 512 along the first dimension 537 (e.g., path/distance) can help define the constraint areas 534 and 536 relative to first object 514 and second object 516. The second dimension 538 can be depicted as a measurement in time (e.g., in seconds). Although FIG. 6 depicts only a portion of time (e.g., time=0 seconds until time=4 seconds), it should be appreciated that constraints can be generated for other increments or durations of time within a multi-dimensional space. In the example of FIG. 6, multi-dimensional space 530 can be considered a path-time (PT) space.

In considering how to generate constraint area 534 for first object 514, consider that first object 514 corresponds to a vehicle traveling at a constant velocity ahead of AV 10 in the same lane 511 as AV 10. Based on this determination, object 514 can be considered a blocking object and will block for all time within the multi-dimensional space 530. As such, a constraint can be generated for first object 514 that prevents AV 10 from being at the same longitudinal distance as first object 514 within lane 511 regardless of how far the AV 10 shifts in the lateral direction within the lane 511. When constraint area 534 is generated for first object 514 in the multi-dimensional space 530, constraint area 534 completely encompasses a lateral swath of the multi-dimensional space 530 corresponding to a start distance 520 and a stop distance 522 along the path dimension for all times (e.g., t=[0,4]) in a given timespan along the time dimension. Because first object 514 is traveling at a constant velocity, constraint area 534 is sloped upward as time progresses from t=0 to t=4 to represent movement of the first object 514.

In considering how to generate constraint area 536 for second object 516, consider that second object 516 corresponds to a pedestrian B determined to be crossing lane 511 from right to left. Features describing the current state of second object 516 including a predicted trajectory can be used to determine that second object 516 is going to enter the lane 511 at time t=1, at which point second object 516 will be considered a blocking object. At time t=3, second object 516 is predicted to exit lane 511 and will no longer be blocking lane 511. As such, constraint area 536 can be generated to represent the blocking object status of second object 516 between start time 524 (e.g., t=1) and stop time 526 (e.g., t=3). Constraint area 536 effectively prevents AV 10 from being positioned between start distance 527 and stop distance 528 from start time 524 (e.g., t=1) until stop time 526 (e.g., t=3).

For both constraint area 534 and constraint area 536, the start distance and stop distance representing such constraints are buffered to correspond to a larger size than the actual distance of first object 514 and second object 516. This is to account for the fact that AV 10 is represented as a point 512 along the first dimension 537. To ensure that AV 10 does not interfere with first object 514, the start distance 520 associated with constraint area 534 is buffered to include an additional distance from the front bumper 517 of AV 10 to point 512 and stop distance 522 is buffered to include an additional distance from point 512 to the rear bumper 518 of AV 10. Similarly, to ensure that AV 10 does not interfere with second object 516, the start distance 527 associated with constraint area 536 is buffered to include an additional distance from the front bumper of AV 10 to point 512 and stop distance 528 is buffered to include an additional stop distance from point 512 to the rear bumper 518 of AV 10.

Referring still to FIG. 6, in some implementations, a constraint generator can be further configured to generate one or more buffer zones, such as buffer zone 540 defined relative to constraint area 536. Buffer zone 540 can provide an additional area in the multi-dimensional space 530 for having further clearance relative to second object 516. In the example of FIG. 6, buffer zone 540 associated with constraint area 536 corresponds to an area within multi-dimensional space 530 that surrounds at least a portion of constraint area 536 within the multi-dimensional space 530. For example, buffer zone 540 has a start time 541 that is before the start time 524 of constraint area 536. Buffer zone 540 provides temporal buffering by having a stop time 542 that is after the stop time 526 of constraint area 536. Buffer zone 540 also provides spatial buffering by having a start distance 543 that is before the start distance 527 of constraint area 536 and a stop distance 544 that is after the stop distance 528 of constraint area 536.

Figure 7:
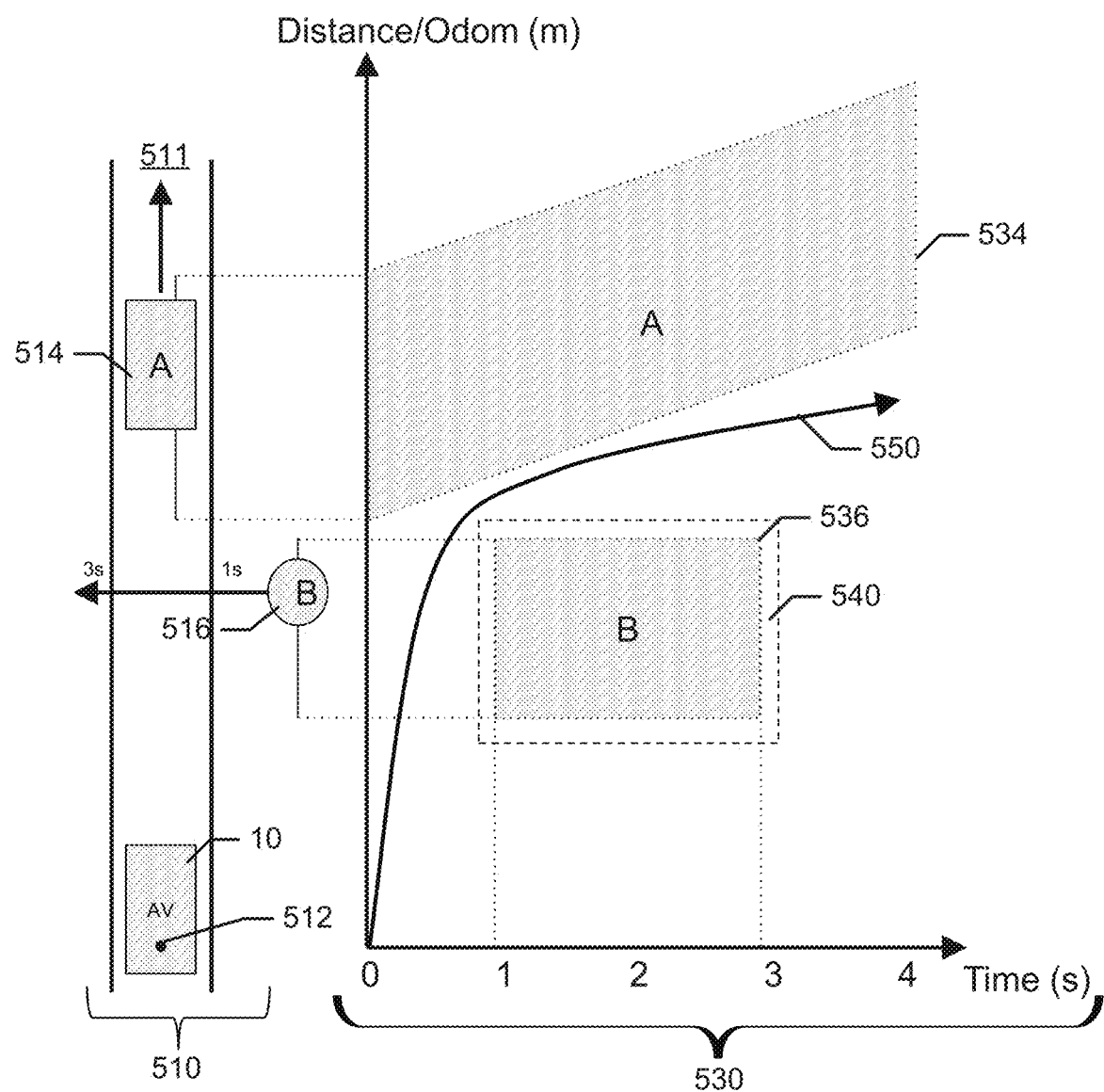
FIG. 7 depicts a graphical representation of determining a speed profile according to example embodiments of the present disclosure.

FIG. 7 depicts a graphical representation of determining an example speed profile according to example embodiments of the present disclosure. More particularly, FIG. 7 depicts an example speed profile 550 that is planned for travel by the AV 10 through the multi-dimensional space 530. Speed profile 550 can be determined, for example, by constraint solver 302 of FIG. 3 or constraint solver 420 of FIG. 5.

Speed profile 550 starts at point (0,0) in the multi-dimensional space 530, corresponding to no distance traveled at time=0. The speed profile can be planned to end at any predetermined future time (e.g., 10 seconds in the future), although FIG. 7 depicts a speed profile 550 determined for a future time of 4 seconds in the future. Speed profile 550 can be determined such that it does not interfere with any of the constraint areas (e.g., constraint areas 534, 536) and buffer zones (e.g., buffer zone 540) generated within the multi-dimensional space 530. By determining a speed profile 550 that does not interfere with any of such areas, a speed profile can be determined that provides a solution that is consistent with all constraints generated within the multi-dimensional space. Because speed profile 550 passes above constraint area 536 and below constraint area 534, a set of navigation decisions represented by speed profile 550 would include a navigation decision to clear second object 516 (e.g., to pass beyond the location of pedestrian B before time t=1) and a navigation decision to follow first object 514 (e.g., to follow behind first object 514 within lane 511).

Figure 8:
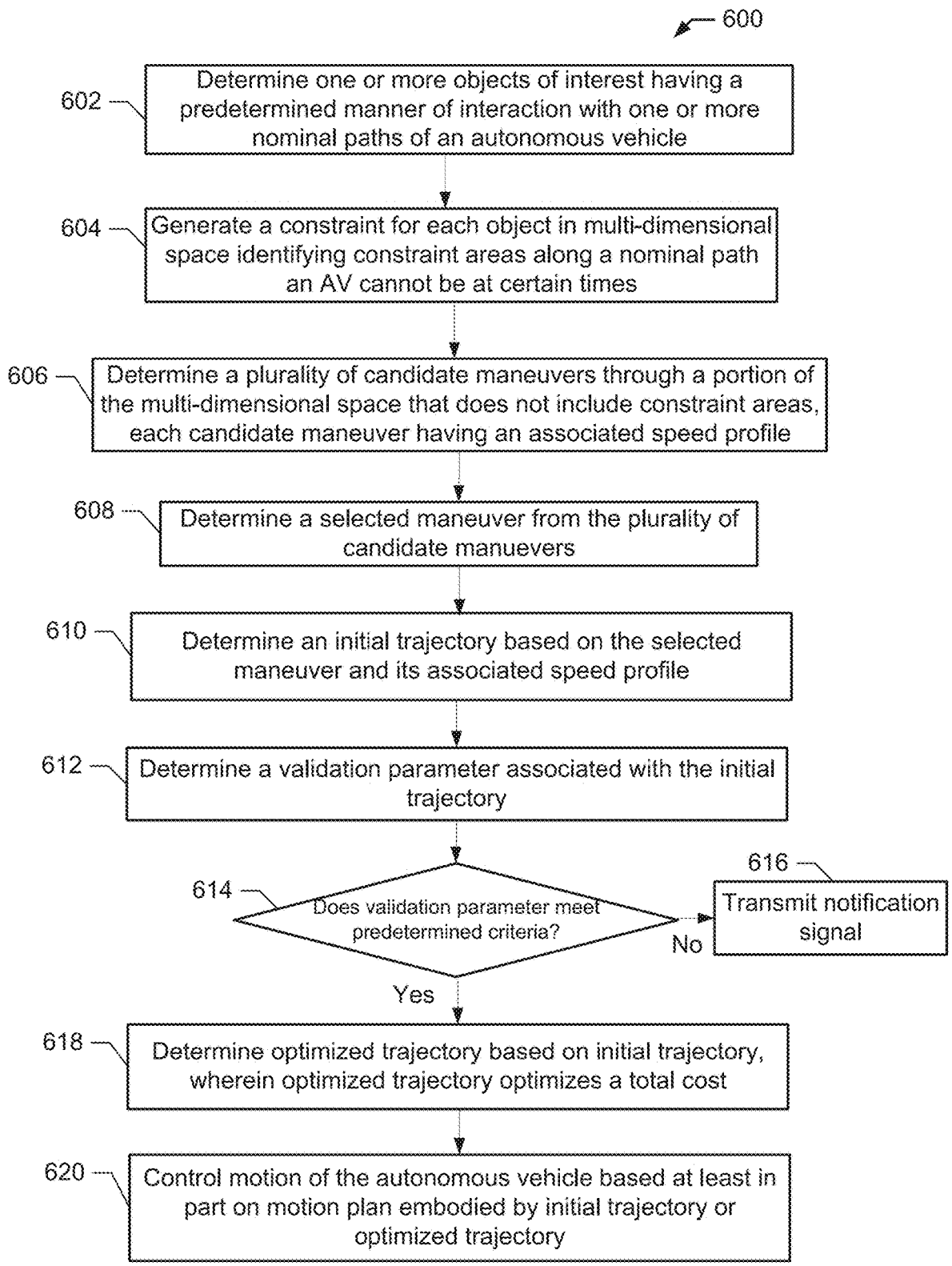
FIG. 8 depicts a flow chart diagram of an example method according to example embodiments of the present disclosure.

FIG. 8 depicts a flow chart diagram of an example method 600 according to example embodiments of the present disclosure. One or more portion(s) of the method 600 can be implemented by one or more computing devices such as, for example, the computing device(s) within autonomy computing system 102 of FIGS. 1 and 9, or remote computing system 730 of FIG. 9. Moreover, one or more portion(s) of the method 600 can be implemented as an algorithm on the hardware components of the device(s) described herein to, for example, determine an initial trajectory and/or optimized trajectory and implement one or more of such trajectories as a motion plan for an autonomous vehicle.

Referring more particularly to FIG. 8, a computing system (e.g., autonomy computing system 102 of FIGS. 1 and 9) including one or more computing devices can implement one or more steps of method 600. At 602, method 600 can include determining one or more objects of interest having a predetermined manner of interaction with the one or more nominal paths. In some implementations, the one or more objects of interest determined at 604 can include one or more of a vehicle, a pedestrian, a bicycle, a traffic light, a stop sign, a crosswalk, or a speed zone.

At 604, method 600 can include generating a constraint for each of the one or more objects of interest determined at 602. In some implementations, each constraint generated at 604 can be defined as a constraint area in a multi-dimensional space identifying regions along the one or more nominal paths that an autonomous vehicle cannot be at certain times. In some embodiments, the multi-dimensional space can include at least a time dimension and a distance dimension relative to travel along the one or more nominal paths. In some implementations, generating a constraint at 604 for each of one or more objects of interest can be implemented by a scenario generator (e.g., scenario generator 206).

At 606, method 600 can include determining a plurality of speed profiles for a corresponding plurality of candidate maneuvers for implementation by an autonomous vehicle. Each of the plurality of speed profiles can be determined to satisfy a plurality of constraints associated with travel by the autonomous vehicle. In some implementations, determining a plurality of speed profiles for a corresponding plurality of candidate maneuvers at 606 can be implemented by a constraint solver (e.g., constraint solver 302 of FIG. 3).

At 608, method 600 can include determining a selected maneuver from the plurality of candidate maneuvers, the selected maneuver being associated with one or more nominal paths for travel. In some implementations, the one or more nominal paths can include one or more predetermined potential paths for travel of the autonomous vehicle based on a common pattern of vehicle travel along one or more lanes of a roadway. In some implementations, determining a selected maneuver at 608 can include generating a score for each candidate maneuver in the plurality of candidate maneuvers. The score can be determined based on one or more costs, discounts, or rewards associated with aspects of a candidate maneuver. Determining a selected maneuver at 608 can further include determining the selected maneuver from the plurality of candidate maneuvers based at least in part on the score for each candidate maneuver in the plurality of candidate maneuvers. In some implementations, determining a selected maneuver from the plurality of candidate maneuvers can be implemented by route selector (e.g., route selector 304 of FIG. 3).

At 610, method 600 can include determining an initial trajectory based on the selected maneuver determined at 608 and the speed profile associated with the selected maneuver, the speed profile being determined at 606. The initial trajectory determined at 610 can include location and speed information over time for travel along the one or more nominal paths. In some implementations, determining an initial trajectory at 610 can be implemented by a warm start generator (e.g., warm start generator 306 including initial trajectory generator 308 of FIG. 3.) In some implementations, determining an initial trajectory at 610 can include translating a current driving speed and a current steering angle of the autonomous vehicle (e.g., autonomous vehicle 10 of FIG. 1) forward in time as the initial trajectory in response to determining an output of the route selector (e.g., route selector 304 of FIG. 3) or the constraint solver (e.g., constraint solver 302 of FIG. 3) is unavailable at a given time frame.

At 612, method 600 can include determining a validation parameter by evaluating the initial trajectory relative to a dynamics equation for the autonomous vehicle for evaluating whether the initial trajectory is implementable by the autonomous vehicle. In some implementations, determining a validation parameter at 612 can be implemented by a warm start generator (e.g., warm start generator 306 including decision validator 310 of FIG. 3.)

At 614, method 600 can include determining whether the validation parameter determined at 612 meets one or more predetermined validation criteria. In one example, the predetermined validation criteria can correspond to the validation parameter(s) having a particular discrete value. In another example, the predetermined validation criteria can correspond to the validation parameter(s) having a value determined in a continuous range such that the value falls above or below some predetermined threshold level.

At 616, method 600 can include generating and/or transmitting a notification signal when the validation parameter(s) is determined at 614 to not meet the predetermined validation criteria.

At 618, method 600 can include determining an optimized trajectory based at least in part on the initial trajectory. In some implementations, determining an optimized trajectory at 618 is implemented after the validation parameter is determined to meet one or more predetermined validation criteria at 614. In some implementations, the optimized trajectory can be determined at 618 by an iterative solver configured to identify a motion plan that optimizes a total cost associated with the motion plan. In some implementations, the iterative solver used for determining an optimized trajectory at 618 can include a gain controller configured to determine one or more gains associated with a lateral command and one or more gains associated with a longitudinal command. In some implementations, the iterative solver used for determining an optimized trajectory at 618 can include an iterative linear quadrative regulator configured to optimize the initial trajectory relative to multiple space dimensions for a given period of time.

At 620, method 600 can include controlling motion of the autonomous vehicle (e.g., autonomous vehicle 10 of FIG. 1) based at least in part on the motion plan embodied by the initial trajectory determined at 610 or the optimized trajectory determined at 618.

Although FIG. 8 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure.

Figure 9:
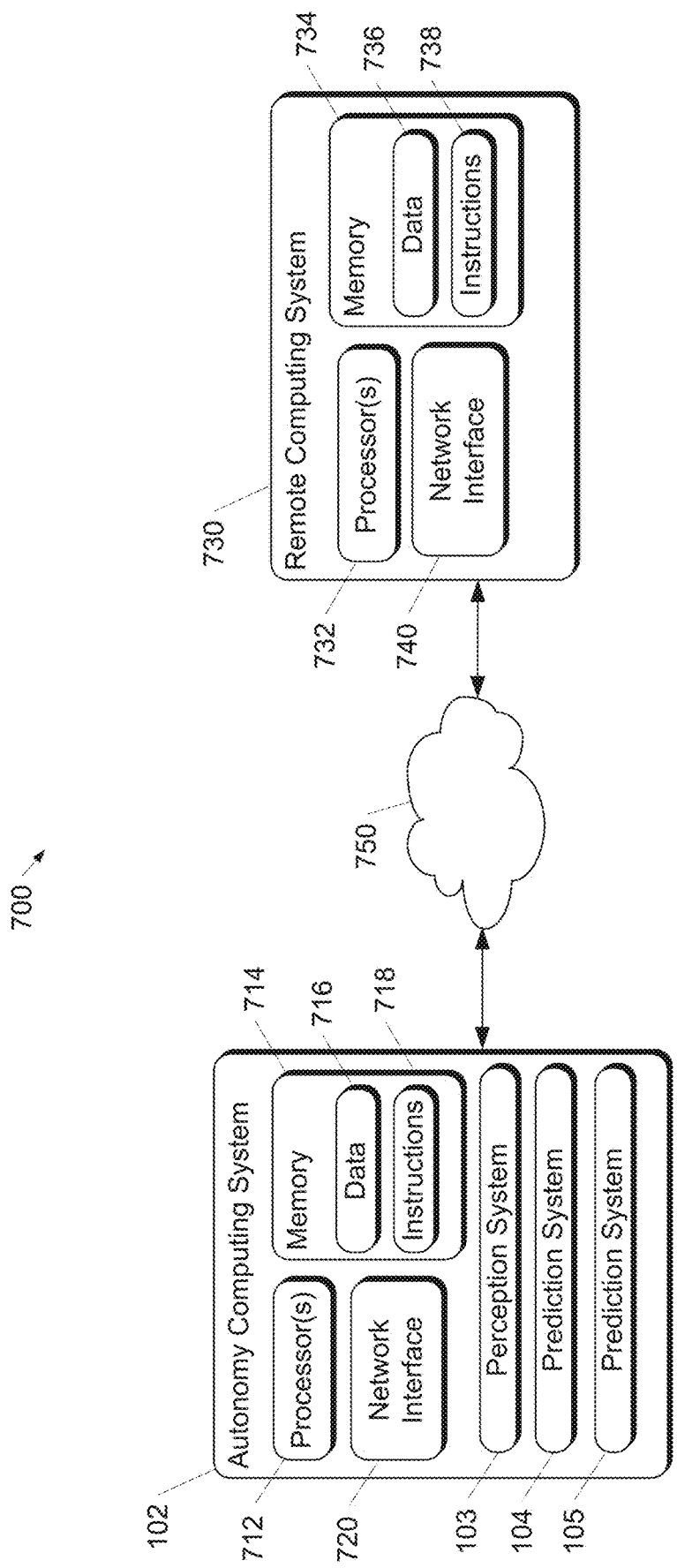
FIG. 9 depicts a block diagram of an example computing system according to example embodiments of the present disclosure.

FIG. 9 depicts a block diagram of an example computing system 700 according to example embodiments of the present disclosure. The example system 700 includes an autonomy computing system 102 and a remote computing system 730 that are communicatively coupled over a network 750.

In some implementations, the autonomy computing system 102 can implement a scenario generator or otherwise control the motion of an autonomous vehicle (e.g., autonomous vehicle 10). In some implementations, the autonomy computing system 102 can be included in an autonomous vehicle. For example, the autonomy computing system 102 can be on-board the autonomous vehicle. In other implementations, the autonomy computing system 102 is not located on-board the autonomous vehicle. The autonomy computing system 102 can include one or more distinct physical computing devices.

The autonomy computing system 102 includes one or more processors 712 and a memory 714. The one or more processors 712 can be any suitable processing device (e.g., a processor core, a microprocessor, an ASIC, a FPGA, a CPU, a GPU, a controller, a microcontroller, etc.) and can be one processor or a plurality of processors that are operatively connected. The memory 714 can include one or more non-transitory computer-readable storage media, such as RAM, ROM, EEPROM, EPROM, one or more memory devices, flash memory devices, etc., and combinations thereof.

In some implementations, the memory 714 can store instructions that when executed by the one or more processors 712 cause the processor to perform operations implemented by one or more of the perception system 103, prediction system 104 and motion planning system 105 as described herein.

The memory 714 can store information that can be accessed by the one or more processors 712. For instance, the memory 714 (e.g., one or more non-transitory computer-readable storage mediums, memory devices) can store data 716 that can be obtained, received, accessed, written, manipulated, created, and/or stored. The data 716 can include, for instance, constraints, speed profiles, candidate maneuvers, initial trajectories, optimized trajectories, motion plans and related autonomy data as described herein. In some implementations, the autonomy computing system 102 can obtain data from one or more memory device(s) that are remote from the system 102.

The memory 714 can also store computer-readable instructions 718 that can be executed by the one or more processors 712. The instructions 718 can be software written in any suitable programming language or can be implemented in hardware. Additionally, or alternatively, the instructions 718 can be executed in logically and/or virtually separate threads on processor(s) 712.

For example, the memory 714 can store instructions 718 that when executed by the one or more processors 712 cause the one or more processors 712 to perform any of the operations and/or functions described herein, including, for example, some or all of the operations described with reference to method 600 of FIG. 8.

Autonomy computing system 102 can also include a network interface 720 used to communicate with one or more systems or devices, including systems or devices that are remotely located from the autonomy computing system 102. The network interface 720 can include any circuits, components, software, etc. for communicating with one or more networks (e.g., network 750). In some implementations, the network interface 720 can include, for example, one or more of a communications controller, receiver, transceiver, transmitter, port, conductors, software, and/or hardware for communicating data.

The remote computing system 730 can correspond to an operations computing system associated with an entity (e.g., a service provider) that provides one or more vehicle service(s) to a plurality of users via a fleet of vehicles that includes, for example, the autonomous vehicle 10 of FIG. 1. The vehicle service(s) can include transportation services (e.g., rideshare services), courier services, delivery services, and/or other types of services. The vehicle service(s) can transport and/or deliver passengers as well as items such as but not limited to food, animals, freight, purchased goods, etc.

Remote computing system 730 can include one or more distinct physical computing devices that respectively include one or more processors 732 and at least one memory 734. The one or more processors 732 can be any suitable processing device (e.g., a processor core, a microprocessor, an ASIC, a FPGA, a CPU, a GPU, a controller, a microcontroller, etc.) and can be one processor or a plurality of processors that are operatively connected. The memory 734 can include one or more non-transitory computer-readable storage mediums, such as RAM, ROM, EEPROM, EPROM, flash memory devices, magnetic disks, etc., and combinations thereof.

The memory 734 can store data 736 and instructions 738 which are executed by the processor 732 to cause remote computing system 730 to perform operations. The instructions 738 can be software written in any suitable programming language or can be implemented in hardware. Additionally, or alternatively, the instructions 738 can be executed in logically and/or virtually separate threads on processor(s) 732. For example, the memory 734 can store instructions 738 that when executed by the one or more processors 732 cause the one or more processors 732 to perform any of the operations and/or functions described herein, for example, one or more of operations 602-620 of FIG. 8.

Remote computing system 730 can also include a network interface 740 used to communicate with one or more systems or devices, including systems or devices that are remotely located from the remote computing system 730. The network interface 740 can include any circuits, components, software, etc. for communicating with one or more networks (e.g., network 750). In some implementations, the network interface 740 can include, for example, one or more of a communications controller, receiver, transceiver, transmitter, port, conductors, software, and/or hardware for communicating data.

The network(s) 750 can be any type of network or combination of networks that allows for communication between devices. In some embodiments, the network(s) can include one or more of a local area network, wide area network, the Internet, secure network, cellular network, mesh network, peer-to-peer communication link, and/or some combination thereof, and can include any number of wired or wireless links. Communication over the network(s) 750 can be accomplished, for instance, via a network interface using any type of protocol, protection scheme, encoding, format, packaging, etc.

FIG. 9 illustrates one example system 700 that can be used to implement the present disclosure. Other computing systems can be used as well. In addition, components illustrated and/or discussed as being included in one of the computing systems 102 and/or 730 can instead be included in another of the computing systems 102 and/or 730. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. An autonomous vehicle control system for an autonomous vehicle, the autonomous vehicle control system comprising:

an initial trajectory generator configured to determine an initial trajectory that includes location and speed information over time for travel of the autonomous vehicle along one or more nominal paths;

wherein the one or more nominal paths comprise one or more predetermined potential paths for travel of the autonomous vehicle based on a common pattern of vehicle travel along one or more lanes of a roadway;

an optimization planner configured to determine an optimized trajectory based at least in part on the initial trajectory; and a vehicle controller configured to control motion of the autonomous vehicle based at least in part on the optimized trajectory.

2. An autonomous vehicle control system as in claim 1, wherein the optimization planner comprises an iterative solver configured to identify a motion plan that optimizes a total cost associated with the motion plan.

3. An autonomous vehicle control system as in claim 2, wherein the iterative solver comprises a gain controller configured to determine one or more gains associated with a lateral command and one or more gains associated with a longitudinal command.

4. An autonomous vehicle control system as in claim 1, wherein the initial trajectory generator is configured to determine a validation parameter by evaluating the initial trajectory relative to a dynamics equation for the autonomous vehicle for evaluating whether the initial trajectory is implementable by the autonomous vehicle.

5. An autonomous vehicle control system as in claim 4, wherein the optimization planner is configured to determine the optimized trajectory after the validation parameter is determined to meet one or more predetermined validation criteria.

6. An autonomous vehicle control system as in claim 5, wherein the initial trajectory generator is configured to transmit a notification signal when the validation parameter is determined to not meet the one or more predetermined validation criteria.

7. An autonomous vehicle control system as in claim 1, wherein the initial trajectory generator is configured to generate the initial trajectory by translating a current driving speed and a current steering angle of the autonomous vehicle forward in time.

8. An autonomous vehicle control system as in claim 1, comprising a constraint solver configured to:

generate a constraint for one or more objects of interest having a predetermined manner of interaction with the one or more nominal paths; and determine a plurality of speed profiles for a corresponding plurality of candidate maneuvers for implementation by the autonomous vehicle, wherein at least one of the plurality of speed profiles is determined to satisfy the plurality of constraints associated with travel by the autonomous vehicle.

9. An autonomous vehicle control system as in claim 8, wherein the one or more objects of interest comprise at least one of: (i) a vehicle, (ii) a pedestrian, (iii) a bicycle, (iv) a traffic light, (v) a stop sign, (vi) a crosswalk, or (vii) a speed zone.

10. A method, comprising:

determining an initial trajectory that includes location and speed information over time for travel of an autonomous vehicle along one or more nominal paths;

wherein the one or more nominal paths comprise one or more predetermined potential paths for travel of the autonomous vehicle based on a common pattern of vehicle travel along one or more lanes of a roadway;

determining an optimized trajectory based at least in part on the initial trajectory, wherein the optimized trajectory is iteratively determined to identify a motion plan that optimizes a total cost associated with the motion plan; and controlling motion of the autonomous vehicle based at least in part on the optimized trajectory.

11. A method as in claim 10, wherein determining the optimized trajectory comprises determining one or more gains associated with a lateral command and one or more gains associated with a longitudinal command.

12. A method as in claim 10, further comprising determining a validation parameter by evaluating the initial trajectory relative to a dynamics equation for the autonomous vehicle for evaluating whether the initial trajectory is implementable by the autonomous vehicle, and wherein determining the optimized trajectory is implemented after the validation parameter is determined to meet one or more predetermined validation criteria.

13. A method as in claim 10, wherein determining an initial trajectory comprises translating a current driving speed and a current steering angle of the autonomous vehicle forward in time as the initial trajectory.

14. A method as in claim 10, comprising:
generating a constraint for one or more objects of interest having a predetermined manner of interaction with the one or more nominal paths, wherein the one or more objects of interest comprise at least one of: (i) a vehicle, (ii) a pedestrian, (iii) a bicycle, (iv) a traffic light, (v) a stop sign, (vi) a crosswalk, or (vii) a speed zone; and
determining a plurality of speed profiles for a corresponding plurality of candidate maneuvers for implementation by the autonomous vehicle, wherein at least one of the plurality of speed profiles is determined to satisfy the plurality of constraints associated with travel by the autonomous vehicle.

15. A method as in claim 14, comprising:
determining a selected maneuver from the plurality of candidate maneuvers, the selected maneuver being associated with the one or more nominal paths for travel, and the initial trajectory being based on a selected maneuver and a speed profile associated with the selected maneuver.

16. A method as in claim 15, wherein determining the selected maneuver comprises:
generating a score for at least one candidate maneuver in the plurality of candidate maneuvers, wherein the score is determined based on one or more costs, discounts or rewards associated with aspects of a candidate maneuver; and
determining the selected maneuver from the plurality of candidate maneuvers based at least in part on the score for the at least one candidate maneuver in the plurality of candidate maneuvers.

17. An autonomous vehicle, comprising:
one or more processors; and
one or more non-transitory computer-readable media that store instructions that, when executed by the one or more processors, cause the one or more processors to perform operations, the operations comprising:
determining an initial trajectory that includes location and speed information over time for travel of an autonomous vehicle along one or more nominal paths;
wherein the one or more nominal paths comprise one or more predetermined potential paths for travel of the autonomous vehicle based on a common pattern of vehicle travel along one or more lanes of a roadway;
determining an optimized trajectory based at least in part on the initial trajectory, wherein the optimized trajectory is determined by an iterative solver configured to identify a motion plan that optimizes a total cost associated with the motion plan; and
controlling motion of the autonomous vehicle based at least in part on the optimized trajectory.

18. An autonomous vehicle as in claim 17, wherein determining an initial trajectory comprises translating a current driving speed and a current steering angle of the autonomous vehicle forward in time as the initial trajectory.

19. An autonomous vehicle as in claim 17, wherein determining the optimized trajectory comprises determining one or more gains associated with a lateral command and one or more gains associated with a longitudinal command.

20. An autonomous vehicle as in claim 17, the operations comprising:
generating a constraint for one or more objects of interest having a predetermined manner of interaction with the one or more nominal paths;
determining a plurality of speed profiles for a corresponding plurality of candidate maneuvers for implementation by the autonomous vehicle; and
determining a selected maneuver from the plurality of candidate maneuvers, the selected maneuver being associated with the one or more nominal paths for travel, and the initial trajectory being based on a selected maneuver and a speed profile associated with the selected maneuver.

\* \* \* \* \*